US008772557B2

(12) United States Patent
Chen et al.

(10) Patent No.: US 8,772,557 B2
(45) Date of Patent: Jul. 8, 2014

(54) AROMATIC HYDROCARBONS FROM DEPOLYMERIZATION AND DEOXYGENATION OF LIGNIN

(75) Inventors: John Qianjun Chen, Glenview, IL (US); Mark Blaise Koch, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 349 days.

(21) Appl. No.: 13/190,751

(22) Filed: Jul. 26, 2011

(65) Prior Publication Data

US 2013/0025191 A1 Jan. 31, 2013

(51) Int. Cl.
*C10L 1/182* (2006.01)

(52) U.S. Cl.
USPC ............. 585/240; 585/14; 585/422; 585/430; 585/433; 585/434

(58) Field of Classification Search
USPC .................. 585/400, 404, 408, 409, 469, 240
See application file for complete search history.

(56) References Cited

U.S. PATENT DOCUMENTS

| | | | | |
|---|---|---|---|---|
| 4,052,292 | A | * | 10/1977 | Espenscheid et al. ........ 585/242 |
| 4,087,318 | A | | 5/1978 | Samuelson et al. |
| 4,141,786 | A | | 2/1979 | Eckert |
| 4,207,076 | A | * | 6/1980 | Bove et al. ...................... 44/430 |
| 4,385,193 | A | | 5/1983 | Bijwaard et al. |
| 4,401,561 | A | | 8/1983 | Thompson et al. |
| 4,420,644 | A | | 12/1983 | Huibers et al. |
| 4,436,586 | A | * | 3/1984 | Elmore .......................... 162/19 |
| 4,647,704 | A | | 3/1987 | Engel et al. |
| 4,992,605 | A | | 2/1991 | Craig et al. |
| 5,019,135 | A | | 5/1991 | Sealock, Jr. et al. |
| 5,959,167 | A | | 9/1999 | Shabtai et al. |
| 5,961,786 | A | | 10/1999 | Freel et al. |
| 7,578,927 | B2 | | 8/2009 | Marker et al. |
| 7,867,296 | B2 | | 1/2011 | Montagne et al. |
| 8,063,258 | B2 | | 11/2011 | Bartek et al. |
| 2003/0115792 | A1 | | 6/2003 | Shabtai et al. |
| 2008/0050792 | A1 | | 2/2008 | Zmierczak et al. |
| 2008/0076945 | A1 | | 3/2008 | Marker et al. |
| 2008/0216391 | A1 | | 9/2008 | Cortright et al. |
| 2008/0312346 | A1 | | 12/2008 | McCall et al. |
| 2008/0312479 | A1 | | 12/2008 | McCall et al. |
| 2009/0022782 | A1 | | 1/2009 | Akita |
| 2009/0253948 | A1 | | 10/2009 | Brandvold et al. |
| 2009/0283442 | A1 | | 11/2009 | McCall et al. |
| 2009/0294324 | A1 | | 12/2009 | Brandvold et al. |
| 2009/0300971 | A1 | | 12/2009 | Abhari et al. |
| 2009/0301930 | A1 | * | 12/2009 | Brandvold et al. ............. 208/17 |
| 2009/0326286 | A1 | | 12/2009 | Yie et al. |
| 2010/0004437 | A1 | | 1/2010 | Binder et al. |
| 2010/0043279 | A1 | | 2/2010 | Abhari et al. |
| 2010/0137663 | A1 | | 6/2010 | Chen et al. |
| 2010/0312027 | A1 | * | 12/2010 | Tsurutani et al. ............. 585/242 |
| 2011/0094147 | A1 | | 4/2011 | Bartek et al. |
| 2011/0167713 | A1 | | 7/2011 | Quignard et al. |
| 2011/0220053 | A1 | * | 9/2011 | Croft et al. ..................... 123/1 A |
| 2012/0005949 | A1 | * | 1/2012 | Stevens et al. ................. 44/307 |

FOREIGN PATENT DOCUMENTS

| | | |
|---|---|---|
| CA | 536549 A | 1/1957 |
| WO | 2006119357 A2 | 11/2006 |
| WO | 2007095787 A1 | 8/2007 |
| WO | 2009037281 A2 | 3/2009 |
| WO | 2009108601 A2 | 9/2009 |

OTHER PUBLICATIONS

Robinson, J.M. et al.; (May 2004) "The use of catalytic hydrogenation to intercept carbohydrates in a dilute acid hydrolysis of biomass to effect a clean separation from lignin"; Source: Biomass and Bioenergy, vol. 26, No. 5, pp. 472-483.
Meier, D.; (Sep. 29, 2008-Oct. 1, 2008) "Catalytic hydrocracking of lignins to useful aromatic feedstocks"; Source: DGMK Tagungsbericht, No. 3, Conference: DGMK Tagungsbericht 2008-3—Future Feedstocks for Fuels and Chemicals, pp. 299-304, 2008.
Okuda, Kazuhide et al.; (Apr. 14, 2004) "Efficient conversion of lignin into single chemical species by solvothermal reaction in water-p-cresol solvent"; Source: Journal of Physics Condensed Matter, vol. 16, No. 14, pp. S1325-S1330, Proceedings of the joint 19th AIRAPT and 41st EHPRG International Conference on High Pressure Science and Technology.
Johnson, D.K. et al.; (Mar. 2002) "Conversion of lignin into a hydrocarbon product for blending with gasoline"; Source: ACS Division of Fuel Chemistry, Preprints, vol. 47, No. 1, pp. 380-381.
De Wild, Paul et al.; (Oct. 2009) "Lignin valorisation for chemicals and (transportation) fuels via (catalytic) pyrolysis and hydrodeoxygenation"; Source: Environmental Progress and Sustainable Energy, vol. 28, No. 3, pp. 461-469, GTI-TechBiomass.
Nagy, Máté et al.; (Sep. 1, 2009) "Catalytic hydrogenolysis of ethanol organosolv lignin"; Source: Holzforschung, vol. 63, No. 5, pp. 513-520.
Kleinert, M. et al.; (Mar./Apr. 2008) "Towards a lignincellulosic biorefinery: Direct one-step conversion of lignin to hydrogen-enriched biofuel"; Source: Energy and Fuels, vol. 22, No. 2, pp. 1371-1379.
Ye, Jie-Wang et al.; (Mar. 2006) "Hydrogenation of straw alkali lignin catalysed by Pd/C catalyst"; Source: Zhongguo Zaozhi Xuebao/Transactions of China Pulp and Paper, vol. 21, No. 1, pp. 73-76; Language: Chinese.
Bridgwater, A.V.; (2004) "Biomass Fast Pyrolysis"; Source: Review paper BIBLID: 0354-9836, vol. 8, No. 2, pp. 21-49.

(Continued)

*Primary Examiner* — Brian McCaig
(74) *Attorney, Agent, or Firm* — Maryann Maas

(57) ABSTRACT

Processes are disclosed that achieve a high conversion of lignin to aromatic hydrocarbons, and that may be carried out without the addition of a base. Depolymerization and deoxygenation, the desired lignin convention steps to yield aromatic hydrocarbons, are carried by contacting a mixture of lignin and a solvent (e.g., a lignin slurry) with hydrogen in the presence of a catalyst. A preferred solvent is a hydrogen transfer solvent such as a single-ring or fused-ring aromatic compound that beneficially facilitates depolymerization and hinders coke formation. These advantages result in favorable overall process economics for obtaining fuel components and/or chemicals from renewable sources.

17 Claims, No Drawings

(56) References Cited

OTHER PUBLICATIONS

U.S. Appl. No. 13/191,211, filed Jul. 26, 2011, Brandvold et al.

U.S. Appl. No. 13/191,213, filed Jul. 26, 2011, Chen.

Thring, Ronald W. et al. Hydrocracking of SOlovysis Lignin in a Batch Reactor: Fuel, v75, n7, p795-800, May 1996; ISSN: 00162361; DOI: 10.1016/0016-2361(96)00036-1; Publisher: Elsevier Ltd.

Davis, H.G. "Direct Liquefaction of Biomass. Final Report and Summary of Effort, 1977-1983 (Wood-Derived Oils)" Department of Energy, Washington, DC.: Report: LBL-16243, 94p, Jun. 1983.

Tang, Zhel et al. "Catalytic Hydrocracking of Pyrolytic Lignin Fuel in Supercritical Ethanol" Industrial and Engineering Chemistry Research, v49, n5, p. 2040-2046, Mar. 3, 2010; ISSN: 08885885, E-ISSn: 15205045; DOI: 10,1021/ie9015842; Publisher: American Chemical Society.

Chen, J.Q., "Methods and Appratuses for Producing Aromatic Hydrocarbon-Containing Effluent," U.S. Appl. No. 13/191,213, filed Jul. 26, 2011.

Shabtai, J. et al. Conversion of Lignin-2. Production of High-Octane Fuel Additives: ACS 217th National Meeting (Anaheim Mar. 21-25, 1999) ACS Division of Fuel Chemistry Preprints (ISSN 0569-3772) V44 n. 2 267-72 (1999), 1999.

Fogler, H.S. (1992). Elements of Chemical Reaction Engineering, 2nd ed., Prentice Hall, 838 pages.

Jones, S.B. et al. "Production of Gasoline and Diesel from Biomass via Fast Pyrolysis, Hydrotreating and Hydrocracking: A Design Case", Department of Energy, Washington, DC; Report:PNNL-18284, 76p, Feb. 2009.

Brandvold, T., et al., "Methods and Apparatuses for Producing Aromatic Hydrocarbon-Rich Effluent From Lignocellulosic Material," U.S. Appl. No. 13/191,211, filed Jul. 26, 2011.

* cited by examiner

AROMATIC HYDROCARBONS FROM DEPOLYMERIZATION AND DEOXYGENATION OF LIGNIN

FIELD OF THE INVENTION

The present invention relates to methods of making aromatic hydrocarbons from the conversion (depolymerization and deoxygenation) of lignin, in addition to fuel compositions comprising a lignin conversion product.

DESCRIPTION OF RELATED ART

Environmental concerns over fossil fuel greenhouse gas (GHG) emissions have led to an increasing emphasis on renewable energy sources. Wood and other forms of biomass including agricultural and forestry residues are examples of some of the main types of renewable feedstocks being considered for the production of liquid fuels. Energy from biomass based on energy crops such as short rotation forestry, for example, can contribute significantly towards the objectives of the Kyoto Agreement in reducing GHG emissions.

Lignocellulosic biomass represents a vast amount of renewable resources available in virtually every part of the world. Lignin is generally present in such biomass in an amount of 15-30% by weight. Lignin-containing residues are generated industrially in large quantities, for example from both ethanol production from biomass and the Kraft process for converting wood pulp to cellulose fibers. It is expected that the lignin supply will continue to increase as ethanol plants using biomass feedstocks such as wood, forestry waste, sawdust, straw, corn stover, sugar cane bagasse, switchgrass etc. are implemented. Since the lignin byproduct is normally burned for its fuel value, alternative end uses have the potential to improve the overall economics of biomass-to-ethanol conversion, paper manufacturing, and other industries that produce lignin residues. Given the molecular structure of lignin, a cross-linked phenolic polymer having an abundance of aromatic rings, the art has recognized the possibility of converting lignin to high value end products, and particularly aromatic hydrocarbon-containing fuel components.

Presently, however, attempts to use of lignin as a feedstock for the production of chemicals or transportation fuel blending components continue to prove commercially impractical due to the high costs of reagents and equipment, as well as the limited conversion to these desired end products. For example, base-catalyzed depolymerization of lignin followed by hydrotreating and hydrocracking is a leading concept for making hydrocarbon fuels, with a representative publication in this field being Johnson et al., FUEL CHEMISTRY PREPRINTS, 47(1): 380-1 (2002). The economics of this process are unfavorable for a number of reasons, and particularly the high cost of the base (e.g., hydroxide solution) that is consumed in the reaction, the limited conversion, and the upgraded metallurgy required to handle the corrosivity of the base under elevated temperatures and pressures. Consequently, improvements in methods for converting lignin to hydrocarbon fuel components, or otherwise renewable analogs of petrochemicals (e.g., aromatic hydrocarbons) used in the manufacture of plastics and other end products, are continually being sought.

SUMMARY OF THE INVENTION

The present invention is associated with the discovery of processes that achieve a high conversion of lignin to aromatic hydrocarbons, and that may be carried out without the addition of a base. Conventionally used strong bases, such as sodium hydroxide or potassium hydroxide, (i) must be replaced in the reaction medium continuously or discontinuously, (ii) require expensive corrosion resistant metallurgy, and (iii) pose chemical handling risks. Advantageously, depolymerization and deoxygenation, the desired lignin conversion steps to yield aromatic hydrocarbons, may be carried out in one stage whereby a mixture of lignin and an aromatic-containing solvent (i.e., a solvent comprising at least one aromatic hydrocarbon) is contacted with hydrogen in the presence of a catalyst. Such lignin conversion methods are associated with favorable overall economics, relative to conventional routes for obtaining fuel components and/or chemicals from renewable sources.

Embodiments of the present invention are directed to methods of making aromatic hydrocarbons. Representative methods comprise contacting hydrogen, in the presence of a catalyst, with a mixture (e.g., a slurry) of lignin and an aromatic-containing solvent under reaction conditions. The conditions are effective to convert (i.e., depolymerize and deoxygenate) at least a portion of the lignin and provide a lignin conversion effluent having an increased quantity of aromatic hydrocarbons relative to the starting feed mixture. The methods further comprise separating a lignin conversion product (e.g., enriched in aromatic hydrocarbons) from the lignin conversion effluent.

Particular embodiments of the present invention are directed to methods for making aromatic hydrocarbons as described above or otherwise a fuel composition or component of a fuel composition. Representative methods comprise mixing, with a solvent comprising a single ring or fused ring aromatic compound, a feedstock comprising lignin to provide a lignin slurry. The methods further comprise contacting the lignin slurry with hydrogen under catalytic depolymerization/deoxygenation conditions to provide a lignin conversion effluent and separating a lignin conversion product from the lignin conversion effluent.

Processes according to any of the above embodiments may additionally comprise blending the lignin conversion product with from 1% to 99% by weight of a petroleum derived fuel such as gasoline. Further embodiments of the invention are therefore directed to methods of preparing fuel compositions described herein. The methods comprise blending a lignin conversion product, and particularly a component produced according to methods described herein, with a petroleum derived component. Representative amounts of the lignin conversion product and petroleum derived components are also described herein. Yet further embodiments of the invention are directed to fuel compositions, and especially motor fuel compositions, comprising a blend of components including the lignin conversion product, which contains aromatic hydrocarbons obtained from the depolymerization/deoxygenation of lignin, according to the methods described herein.

These and other embodiments and aspects pertaining to the present invention are apparent from the following Detailed Description.

DETAILED DESCRIPTION

The lignin used as a feedstock in processes described herein may be obtained from a variety of biomass sources, and particularly residues from wood and crops, including forestry wastes, sawdust, straw, corn stover, and bagasse. Lignin is understood in the art to refer to the cross-linked, polymeric macromolecule that bonds to cellulose and hemicellulose, thereby conferring strength to plant (e.g., wood) cell walls. The utility of lignin as a precursor for making aromatic oxygenates through depolymerization and ultimately aromatic hydrocarbons through deoxygenation resides in the high content of aromatic rings in the biomolecule. These rings originate from three aromatic monomers, namely p-coumaryl alcohol, coniferyl alcohol, and sinapyl alcohol, which are methoxylated to various extents.

According to representative embodiments, the lignin may be obtained as a byproduct of wood pulping, and particularly the "black liquor" that results from the conversion of wood into wood pulp consisting almost pure cellulose fibers. This conversion, as part of the Kraft process, breaks the bonds linking lignin to the cellulose, thereby separating lignin into the black liquor, which may have a solids content ranging from about 10%-80%, depending on the evaporator stage at which the black liquor is removed from the Kraft process. Alternatively, the lignin may be obtained as a co-product of the manufacture of ethanol from biomass (i.e., cellulosic ethanol). A further source of lignin (pyrolytic lignin) may be obtained from the pyrolysis, or thermal decomposition, of biomass, in the substantial absence of oxygen (or in the presence of significantly less oxygen than required for complete combustion). "Fast pyrolysis" of biomass has recently gained significant commercial interest and refers generally to technologies involving rapid heat transfer to the biomass feedstock, which is maintained at a relatively high temperature for a very short time. The temperature of the primary pyrolysis products is then rapidly reduced before chemical equilibrium is achieved. The fast cooling therefore prevents the valuable reaction intermediates, formed by fragmentation of the biomass building blocks, from degrading to non-reactive, low-value final products. A number of fast pyrolysis processes are described in U.S. Pat. No. 5,961,786; Canadian Patent Application 536,549; and by Bridgwater, A. V., "Biomass Fast Pyrolysis," Review paper BIBLID: 0354-9836, 8 (2004), 2, 21-49. Fast pyrolysis processes include Rapid Thermal Processing (RTP), in which an inert or catalytic solid particulate is used to carry and transfer heat to the feedstock. RTP has been commercialized and operated with very favorable yields (55-80% by weight, depending on the biomass feedstock) of raw pyrolysis oil. The separation of pyrolytic lignin from raw pyrolysis oil is described, for example, in U.S. Pat. No. 7,578,927.

Suitable biomass sources for cellulosic ethanol production and biomass pyrolysis can be any lignocellulosic material, and especially a plant material, including a hardwood (e.g., whitewood), a softwood, or a hardwood or softwood bark. Energy crops, or otherwise agricultural residues (e.g., logging residues) or other types of plant wastes or plant-derived wastes, may also be used as plant materials. Specific exemplary plant materials include corn fiber, corn stover, and sugar cane bagasse, in addition to "on-purpose" energy crops such as switchgrass, miscanthus, and algae. Short rotation forestry products, as energy crops, include alder, ash, southern beech, birch, eucalyptus, poplar, willow, paper mulberry, Australian blackwood, sycamore, and varieties of paulownia elongate. Other examples of suitable biomass include organic waste materials, such as sawdust, waste paper and construction, demolition, and municipal wastes.

According to representative methods for converting lignin to aromatic hydrocarbons as fuel components or chemical intermediates, the lignin is mixed with a suitable solvent, preferably having the capability to facilitate hydrogen transfer in the reaction medium. Representative solvents are aromatic-containing solvents comprising one or more aromatic hydrocarbons (e.g., single ring aromatic compounds such as benzene, toluene, and xylenes and/or fused ring aromatic compounds such as tetralin and its alkylated derivatives). The solvent may or may not have the capability to dissolve all of the lignin (as required to form a lignin solution) in the lignin/solvent mixture. Often, at least some of the lignin is not dissolved, such that the lignin mixture is a lignin slurry. Without being bound by theory, it is believed that aromatic hydrocarbons and/or other compounds beneficially introduce a hydrogen transfer functionality to the solvent, thereby limiting detrimental coke formation and/or re-polymerization reactions that limit conversion and reduce product yields, as well as shorten catalyst life.

Aromatic hydrocarbon-containing byproducts of hydrocarbon conversion processes are therefore suitable for use in all or part of representative aromatic-containing solvents. Such byproducts generally comprise a significant fraction (e.g., generally at least about 10% by volume, typically least about 50% by volume, and often at least about 75% by volume) of aromatic hydrocarbons, including benzene and naphthalene and their alkylated derivatives. Other representative aromatic-containing solvents, as byproducts of hydrocarbon conversion processes, include $C_9$ and higher carbon number ($C_9^+$) hydrocarbon fractions that may be obtained, for example, from catalytic reforming (e.g., used to produce aromatic hydrocarbons from naphtha feedstocks), and more particularly from the separation (e.g., fractionation) of catalytic reforming effluents into such fractions.

The mixture of lignin and solvent, for example an aromatic-containing solvent, is contacted with hydrogen in the presence of catalyst under conditions which promote the depolymerization of lignin to aromatic oxygenate substituents (e.g., phenol, and its alkoxylated derivatives) and also the deoxygenation (or hydrodeoxygenation) of these substituents or intermediates to aromatic hydrocarbons. The catalyst may be present in the form of solid particles comprising a catalytically active metal disposed on a support, with suitable metals and supports being described below. The catalyst, either supported or otherwise unsupported (e.g., in the form of fine particles of a compound containing the catalytically active metal), may be used in a fixed bed or moving bed, such as in the case of a slurry reactor. Homogeneous systems operating with catalysts that are soluble in the reactants and products may also be used. Catalytic depolymerization/deoxygenation conditions will vary depending on the quality of the lignin conversion effluent desired, with higher severity operations directionally resulting in greater conversion of organic oxygenate intermediates and other oxygenated species (e.g., carboxylic acids) by hydrogenation.

Typical reaction conditions include a temperature from about 40° C. (104° F.) to about 700° C. (1292° F.), often from about 200° C. (302° F.) to about 600° C. (1112° F.), and a hydrogen partial pressure from about 700 kPa (100 psig) to about 21 MPa (3000 psig), often from about 5.5 MPa (800 psig) to about 13.8 MPa (2000 psig). In addition to pressure and temperature, the residence time of the lignin mixture (e.g., lignin slurry) and hydrogen in the depolymerization/deoxygenation reaction zone can also be adjusted to increase or decrease the reaction severity and consequently the quality of the resulting lignin conversion effluent. With all other variables unchanged, lower residence times are associated with lower reaction severity. The inverse of the residence time is related to a variable known as the Weight Hourly Space Velocity (WHSV, expressed in units of $hr^{-1}$), which is the weight flow rate of the feed (e.g., the lignin mixture) divided by the catalyst weight and represents the equivalent number of catalyst beds (on a weight basis) of feed processed per hour. Therefore, increasing the WHSV, or flow rate of feed processed over a given quantity of catalyst, directionally decreases residence time and consequently the extent of the depolymerization and deoxygenation conversion reactions. A typical range of WHSV according to the present invention is from about 0.1 hr$^{-1}$ to about 20 hr$^{-1}$, often from about 0.5 hr$^{-1}$ to about 10 hr$^{-1}$. The quantity of hydrogen used may be based on the stoichiometric amount needed to completely convert the oxygen present in the lignin to $H_2O$. In representative embodiments, the reaction may be carried out in the presence of hydrogen in an amount ranging from about 90% to about 600% of the stoichiometric amount.

Suitable catalysts have a hydrogenation function that promotes the deoxygenation of lignin and its depolymerized substituents to produce water and aromatic hydrocarbons. The hydrogenation function is generally a catalytic metal, which may be noble or non-noble. Representative catalysts include those comprising at least one Group VIII metal as a hydrogenation function, such as iron, cobalt, and nickel (e.g., cobalt and/or nickel) and/or at least one Group VI metal, such as molybdenum and tungsten. Noble metals, such as ruthenium, palladium, and platinum, may also be used for the hydrogenation function. A representative hydrogenation function is therefore selected from the group consisting of ruthenium, platinum, palladium, iron, cobalt, nickel, molybdenum, tungsten, and mixtures thereof (e.g., a mixture of cobalt and molybdenum).

A Group VIII metal, when used, is typically present in the catalyst in an amount ranging from about 2 to about 25 weight percent, and normally from about 4 to about 20 weight percent, based on the volatile-free catalyst weight. A Group VI metal is typically present in an amount ranging from about 1 to about 25 weight percent, and normally from about 2 to about 25 weight percent, also based on the volatile-free catalyst weight. A volatile-free catalyst sample may be obtained by subjecting the catalyst to drying at 200-350° C. (392-662° F.) under an inert gas purge or vacuum for a period of time (e.g., 2 hours), so that water and other volatile components are driven from the catalyst. In general, the hydrogenation function is disposed on a high surface area support material such as a refractory inorganic oxide (e.g., silica, alumina, titania, and/or zirconia). A carbon support may also be used. A representative catalyst therefore comprises a metal selected from the group consisting of nickel, cobalt, tungsten, molybdenum, and mixtures thereof (e.g., a mixture of cobalt and molybdenum), deposited on any of these support materials, or combinations of support materials.

Preferably, the catalyst has both a hydrogenation function, as described above, and an acid function, which is generally a support material that imparts acidity to the catalyst. Acidity may be determined, for example in units of millimoles of acid sites per gram of catalyst, by temperature programmed desorption (TPD) of a quantity of ammonia, from an ammonia-saturated sample of the catalyst, over a temperature from 275° C. (527° F.) to 500° C. (932° F.), which is beyond the temperature at which the ammonia is physisorbed. The quantity of acid sites therefore corresponds to the number of moles of ammonia that is desorbed in this temperature range. Representative acid functions include acidic support materials for the hydrogenation function, and such support materials may be used as the entire, solid catalyst support or otherwise may be incorporated (e.g., by blending) into a relatively non-acidic support (e.g., silica or high Si/Al ratio zeolite) to impart acidity. Some acid functions may otherwise be used as binders (e.g., of zeolite crystallites) and/or fillers in an overall catalyst composition. Representative acidic support materials that can serve as the acid function include clays (e.g., minugel, kaolin, kaolinites, halloysite, etc.), zeolites, non-zeolitic molecular sieves, mixed metal oxides, sulfated zirconia, and other materials that contain acid sites and that can be used in varying amounts to regulate the overall acidity of the catalyst.

It is within the scope of the invention to use more than one type of catalyst for carrying out the depolymerization/deoxygenation of lignin, and different catalysts may be used in the same or a different reaction vessel. Two or more different catalysts and one or more quench points may also be utilized in a reaction vessel or vessels to provide the lignin conversion effluent.

After reaction of lignin, in the lignin mixture, in the presence of hydrogen, a catalyst, and conditions as described above, the effluent obtained directly from the lignin depolymerization/deoxygenation reaction (i.e., the lignin conversion effluent) prior to any downstream separation and purification steps, has an organic oxygen content that is generally reduced to less than about 20%, and often to less than about 10% of the oxygen content of the liquid feedstock, namely the lignin mixture (e.g., lignin slurry). Organic oxygen originally present in the lignin molecular structure is therefore generally converted, to a large extent, to water that is easily separated from the desired hydrocarbons recovered in the lignin conversion product. Accompanying its decrease in organic oxygen is an increase in the heating value, on a mass basis, of the lignin conversion effluent. This heating value increases typically by a factor ranging from about 1.5 to about 3, compared to that of the lignin.

Fractionation or other separation methods may then be used to separate the desired aromatic hydrocarbons, as a lignin conversion product, from hydrogen, light hydrocarbons, water, and other lower value byproducts present in the effluent. At least a portion of the separated hydrogen, optionally together with light hydrocarbons, may be recycled to the reactor (or depolymerization/deoxygenation reaction zone), such that the combined gas stream of make-up hydrogen (which may be of varying purity) and recycle hydrogen is sufficient to achieve a hydrogen partial pressure within the ranges described above. The lignin conversion product, obtained after this separation of byproducts, comprises predominantly hydrocarbons, typically at least about 90% hydrocarbons (e.g., from about 90% to about 99.9% hydrocarbons) by weight, and often at least about 97% hydrocarbons (e.g., from about 97% to about 99.5% hydrocarbons) by weight.

The organic oxygenate content of the lignin conversion product is generally less than about 1% by weight and typically less than about 0.1% by weight, with lower amounts of organic oxygen being generally associated with more severe hydrodeoxygenation conditions (e.g., higher temperatures and hydrogen partial pressures, and lower LHSV). While a reduction in organic oxygenates (e.g., phenol derivatives such as alkylated phenols) directionally increases heating value, this improvement in the quality of the lignin conversion product is achieved at the expense of increased energy required for the depolymerization/deoxygenation reactions. Optimization of the organic oxygen content is therefore possible, depending on the intended end use. If desired, for example, further processing may be used to reduce the organic oxygenate content to less than 10 ppm, and even less than 1 ppm by weight, rendering the lignin conversion product suitable as a blending component for a number of transportation fuels, including aviation fuel. Advantageously, the aromatic hydrocarbon content of the lignin conversion product is relatively high, generally from about 40% to about 90%, and typically from about 55% to about 85%. Associated with this level of aromatic hydrocarbons is a high research octane number (RON), generally from about 93 to about 107, and typically from about 95 to about 105, such that the lignin conversion product has favorable characteristics for blending into fuel compositions, and particularly gasoline compositions comprising petroleum derived gasoline and conventional gasoline blending components such as ethanol, as discussed in greater detail below.

The lignin conversion product is separated from the total lignin conversion effluent using any of a number possible separation/purification steps including single-stage and/or multiple stage vapor-liquid equilibrium contacting (e.g., flash separation and/or distillation). According to representative embodiments, the lignin conversion product may be separated from light byproducts of the depolymerization/deoxygenation reaction, and particularly light byproducts comprising $C_4$ and lower carbon number ($C_4^-$) hydrocarbons and/or methanol that are present in the lignin conversion effluent (e.g., as cracked hydrocarbon byproducts). According to particular embodiments, at least some of the hydrogen used in the reaction may advantageously be produced from these light byproducts, for example by catalytic steam reforming Representative processes may therefore further comprise generating, from at least a portion of the light byproducts, at least a portion of the hydrogen for contacting with the mixture of lignin and the aromatic-containing solvent in the depolymerization/deoxygenation reaction.

The generation of hydrogen from byproducts (e.g., light hydrocarbons) of the depolymerization and deoxygenation reactions, can involve, in the overall production of aromatic hydrocarbons from lignin, integration with a hydrogen generation unit. In an exemplary embodiment, a catalytic steam reformer, in which at least a portion of the $C_4^-$ hydrocarbons and/or at least a portion of the methanol are catalytically reformed in the presence of steam, is integrated with catalytic lignin conversion unit or reaction zone. Representative steam reforming catalysts include alumina supported nickel oxide. Importantly, the generation of hydrogen in this manner (i.e., from byproducts obtained from the processing of feedstocks comprising renewable carbon) reduces, or can even eliminate, the amount of hydrogen that must be obtained from external fossil sources (imported), thereby beneficially lowering the lifecycle greenhouse gas (GHG) emission value of the aromatic hydrocarbon product. Therefore, the carbon footprint of end products, including fuel compositions having the aromatic hydrocarbons as blending component, or plastics (e.g., purified terephthalic acid) made from the aromatic hydrocarbons, is reduced.

The lignin conversion product, following separation from the lignin conversion effluent, may therefore be blended with comparable petroleum derived components and possibly other suitable additives. In a fuel composition, the lignin conversion product may be present in the composition in an amount of typically up to about 50% by weight or more. While such compositions may comprise or consist of entirely one or more components derived from renewable sources, such as the lignin conversion product and optionally a pyrolysis derived component and/or corn-, sugar-, or biomass-derived ethanol, the compositions generally comprise blends of the lignin conversion product component and at least one petroleum derived component. Relatively high proportions of the lignin conversion product and optionally other component(s) derived from renewable sources (i.e., greater than 50% by weight) will be primarily a function of the commercial scale production volumes of these components that may ultimately be achieved using lignin conversion, pyrolysis, and other biofuel production methods compared to petroleum refining. In any event, by blending the lignin conversion product with conventional petroleum derived gasoline according to fuel compositions described herein, the carbon footprint of the blend can be reduced.

Representative fuel compositions according to embodiments of the invention comprise from about 1% to about 50% of the lignin conversion product, having a high content of aromatic hydrocarbons as described above. A particular fuel composition, for example, may comprise from 1% to about 30% of the lignin conversion product by weight, in addition to from about 50% to 98% or more (e.g., from about 50% to about 99%) petroleum derived gasoline by weight and optionally ethanol. When ethanol is incorporated into the composition, it is typically present in an amount from 1% to about 20% by volume. As a result of being subjected to deoxygenation conditions in the presence of hydrogen, this component may have a higher heating value than ethanol, among other properties (e.g., density and boiling range according to ASTM D86) meeting the standards established for petroleum derived components used in gasoline blending. Of more general interest with respect to the compositions described herein are automotive spark-ignition engine fuels.

While the lignin conversion product can meet the gasoline standards required of petroleum derived gasoline, its carbon footprint is greatly reduced according to U.S. government GHG emission accounting practices, in which emissions associated with the combustion of biomass derived fuels are not reported in the lifecycle GHG emission value, as biomass is renewed over a very short time frame compared to petroleum derived components. Lifecycle assessment values of emissions in terms of $CO_2$ equivalents, from raw material cultivation (in the case of plant materials) or raw material extraction (in the case of fossil fuels) through fuel combustion, can be calculated using SimaPro 7.1 software and IPCC GWP 100a methodologies.

In representative fuel compositions associated with the present invention, the lignin conversion product may be blended with petroleum derived gasoline. Representative methods according to the invention, for example, comprise blending the lignin conversion product, separated from the lignin conversion effluent, with from 1% to 99% by weight of petroleum derived gasoline. Often, the petroleum derived gasoline is present in the resulting fuel composition in an amount from about 30% to about 98% by weight. According to particular fuel compositions, (i) generally from 1 to about 50%, and typically from 1 to about 30%, of the lignin conversion product by weight is blended with (ii) generally from about 30% to about 99%, and typically from about 50% to about 98% of petroleum derived gasoline by weight, optionally in addition to (iii) generally from 1% to about 30%, and typically from 1% to about 20%, ethanol by volume.

Overall, aspects of the invention are directed to methods for converting lignin to valuable end products with favorable economics, at least partly as the result of reduced chemical (e.g., caustic) requirements. Other aspects are directed to products obtained from these methods. Those having skill in the art, with the knowledge gained from the present disclosure, will recognize that various changes could be made in these methods and products without departing from the scope of the present invention. Mechanisms used to explain theoretical or observed phenomena or results, shall be interpreted as illustrative only and not limiting in any way the scope of the appended claims.

The following examples are set forth as representative of the present invention. These examples are not to be construed as limiting the scope of the invention as other equivalent embodiments will be apparent in view of the present disclosure and appended claims.

COMPARATIVE EXAMPLE 1

Lignin Conversion in the Presence of a Non-Aromatic (Hexadecane) Solvent

A 25 gram portion of lignin Indulin AT (industrial Kraft lignin) and 161 grams of hexadecane were charged into a 500 ml autoclave reactor. A 5 gram portion of ground Ni—Mo/$SiO_2$—$Al_2O_3$ catalyst was then added to the reactor. The reactor was then sealed and purged with nitrogen. Hydrogen gas was thereafter used to pressure the reactor to reach 3.6 MPa gauge pressure (524 psig) at room temperature, and the reaction mixture of lignin and hexadecane solvent was stirred at 1500 rpm. The reactor temperature was then raised from room temperature to 392° C. (738° F.), held at this temperature for 7 hours, and cooled down. The reaction product (containing the lignin conversion effluent) was filtered. The amount of dry solids recovered was 16.6 grams, corresponding to 11.6 grams of unconverted lignin (16.6 g solid minus 5.0 g catalyst=11.6 g). The calculated lignin conversion was therefore 54%.

EXAMPLE 1

Lignin Conversion in the Presence of an Aromatic (Toluene) Solvent

A 25 gram portion of lignin Indulin AT (industrial Kraft lignin) and 161 grams of toluene were charged into a 500 ml autoclave reactor. A 5 gram portion of ground Ni—Mo/$SiO_2$—$Al_2O_3$ catalyst was then added to the reactor. The reactor was then sealed and purged with nitrogen. Hydrogen gas was thereafter used to pressure the reactor to reach 3.5 MPa gauge pressure (511 psig) at room temperature, and the reaction mixture of lignin and toluene solvent was stirred at 1000 rpm. The reactor temperature was then raised from room temperature to 392° C. (738° F.), held at this temperature for 7 hours, and cooled down. The reaction product (containing lignin conversion effluent) was filtered. The amount of dry solids recovered was 5 grams, corresponding to the entire weight of the catalyst charged to the reactor. Since no unconverted liquid was present in the recovered solids, based on this weight, the calculated lignin conversion was 100%.

These experiments demonstrate the significant improvement in lignin conversion obtained when an aromatic-containing solvent is used.

The invention claimed is:

1. A method of making aromatic hydrocarbons comprising:
   (a) contacting hydrogen, in the presence of a catalyst, with a mixture of lignin and an aromatic-containing solvent under reaction conditions effective to convert at least a portion of the lignin and provide a lignin conversion effluent having an increased quantity of aromatic hydrocarbons relative to the mixture, wherein the aromatic-containing solvent contains at least about 50% by volume aromatic hydrocarbons and the reaction conditions comprise a hydrogen partial pressure from 700 kPa (100 psig) to about 21 MPa (3000 psig); and
   (b) separating a lignin conversion product from the lignin conversion effluent.

2. The method of claim 1, wherein the aromatic-containing solvent comprises a single ring or fused ring aromatic compound.

3. The method of claim 1, wherein the aromatic-containing solvent comprises a byproduct of a hydrocarbon conversion process.

4. The method of claim 3, wherein the byproduct is a $C_9^+$ hydrocarbon fraction.

5. The method of claim 1, wherein the catalyst has both a hydrogenation function and an acid function.

6. The method of claim 5, wherein the hydrogenation function is a catalytic metal selected from the group consisting of ruthenium, platinum, palladium, iron, cobalt, nickel, molybdenum, tungsten, and mixtures thereof.

7. The method of claim 5, wherein the acid function is an acidic support material selected from the group consisting of a clay, a zeolite, a non-zeolitic molecular sieve, a mixed metal oxide, sulfated zirconia, and mixtures thereof.

8. The method of claim 1, wherein the reaction conditions include a temperature from about 200° C. (392° F.) to about 600° C. (1112° F.), and a weight hourly space velocity (WHSV) from about 0.1 $hr^{-1}$ to about 20 $hr^{-1}$.

9. The method of claim 1, wherein the lignin is obtained from the pyrolysis of biomass.

10. The method of claim 1, wherein the biomass is selected from the group consisting of hardwood, softwood, hardwood bark, softwood bark, corn fiber, corn stover, sugar cane bagasse, switchgrass, miscanthus, algae, waste paper, construction waste, demolition waste, municipal waste, and mixtures thereof.

11. The method of claim 1, wherein at least a portion of the lignin is obtained as a byproduct of wood pulping.

12. The method of claim 1, wherein at least a portion of the lignin is obtained as a co-product of ethanol production from biomass.

13. The method of claim 1, wherein the lignin conversion product comprises less than about 0.1% organic oxygen by weight.

14. The method of claim 1, wherein the lignin conversion product comprises at least about 97% hydrocarbons by weight.

15. The method of claim 1, wherein the lignin conversion product comprises from about 55% to about 85% aromatic hydrocarbons by weight.

16. The method of claim 1, wherein the lignin conversion product has a research octane number (RON) from about 95 to about 105.

17. A method for making a fuel composition, the method comprising:
   (a) forming a lignin mixture comprising lignin and a solvent comprising a single ring or fused ring aromatic compound, wherein the solvent contains at least about 50% by volume of aromatic hydrocarbons;
   (b) contacting the lignin mixture with hydrogen under catalytic depolymerization/deoxygenation conditions to provide a lignin conversion effluent, wherein the catalytic depolymerization/deoxygenation conditions comprise a hydrogen partial pressure from 700 kPa (100 psig) to about 21 MPa (3000 psig);
   (c) separating a lignin conversion product from the lignin conversion effluent; and
   (d) blending the lignin conversion product with from 1% to 99% by weight of a petroleum derived gasoline.

* * * * *